C. SCHALLER.
CALCULATING MACHINE.
APPLICATION FILED JULY 10, 1916.

1,400,004.

Patented Dec. 13, 1921.
6 SHEETS—SHEET 1.

C. SCHALLER.
CALCULATING MACHINE.
APPLICATION FILED JULY 10, 1916.
1,400,004.
Patented Dec. 13, 1921.
6 SHEETS—SHEET 2.
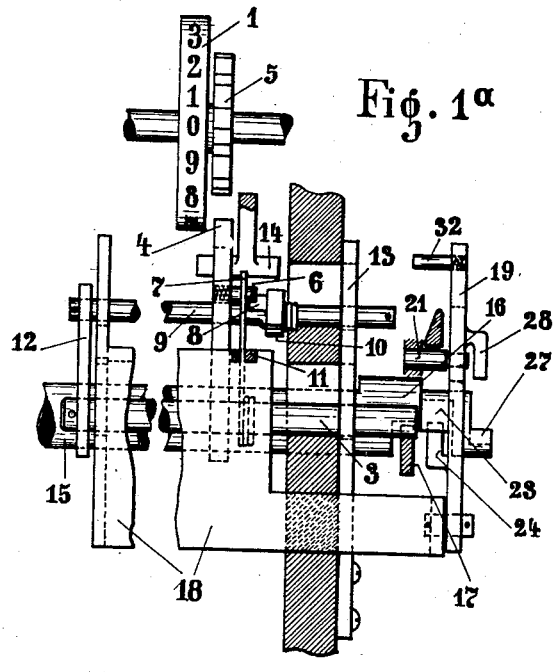
Fig. 1ª
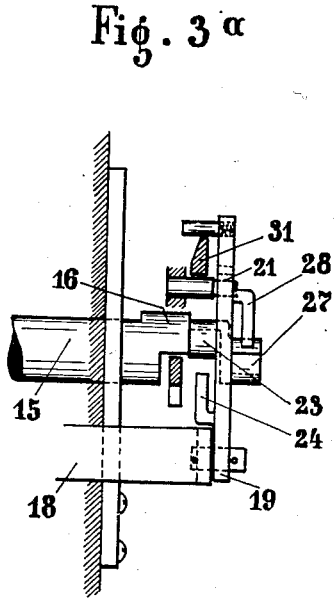
Fig. 3ª
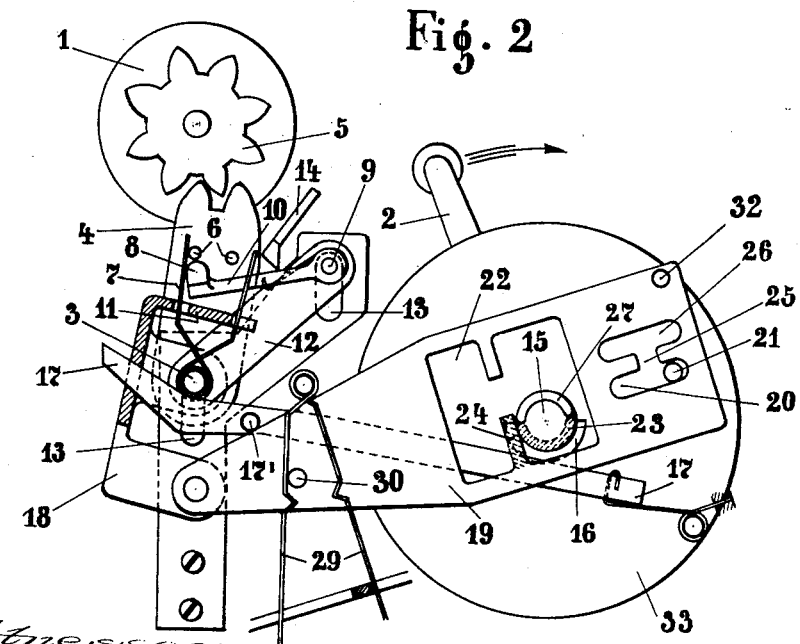
Fig. 2
Inventor
Carl Schaller

C. SCHALLER.
CALCULATING MACHINE.
APPLICATION FILED JULY 10, 1916.

1,400,004.

Patented Dec. 13, 1921.
6 SHEETS—SHEET 3.

Witnesses:

Inventor
Carl Schaller
by
Attorney

C. SCHALLER.
CALCULATING MACHINE.
APPLICATION FILED JULY 10, 1916.
1,400,004.
Patented Dec. 13, 1921.
6 SHEETS—SHEET 4.
Fig. 5
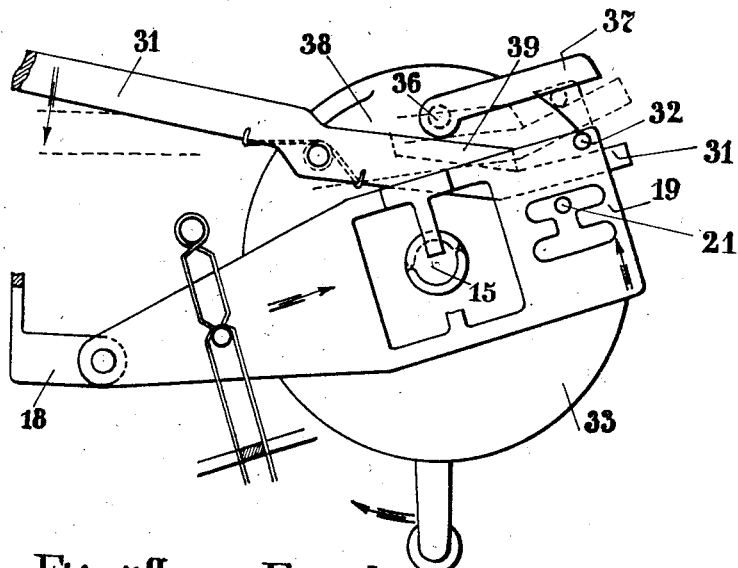
Fig. 5<sup>a</sup>   Fig. 5<sup>b</sup>   Fig. 5<sup>c</sup>
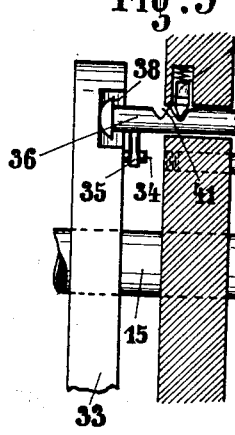 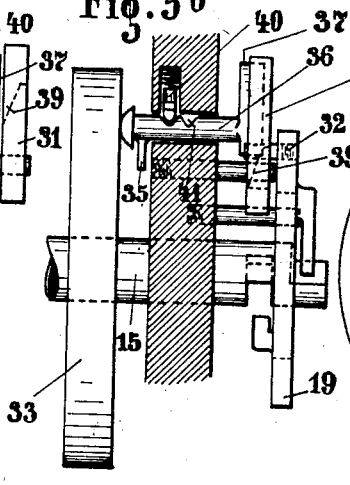 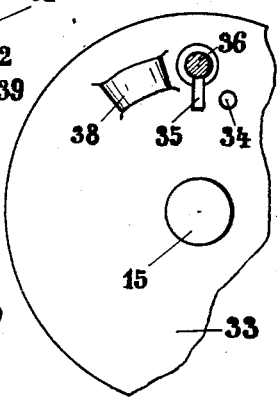
Witnesses:
M. E. McHade
Inventor
Carl Schaller
by
James L. Norris,
Attorney C. SCHALLER.
CALCULATING MACHINE.
APPLICATION FILED JULY 10, 1916.
1,400,004.
Patented Dec. 13, 1921.
6 SHEETS—SHEET 5.
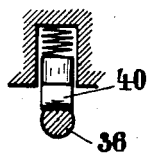
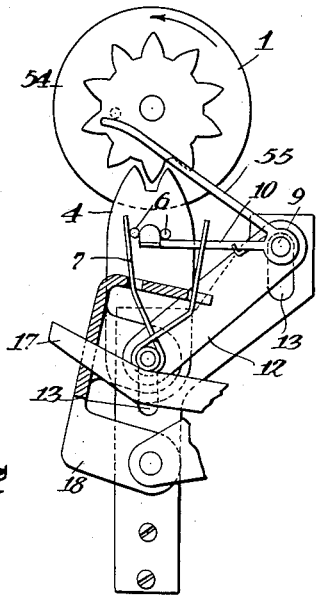
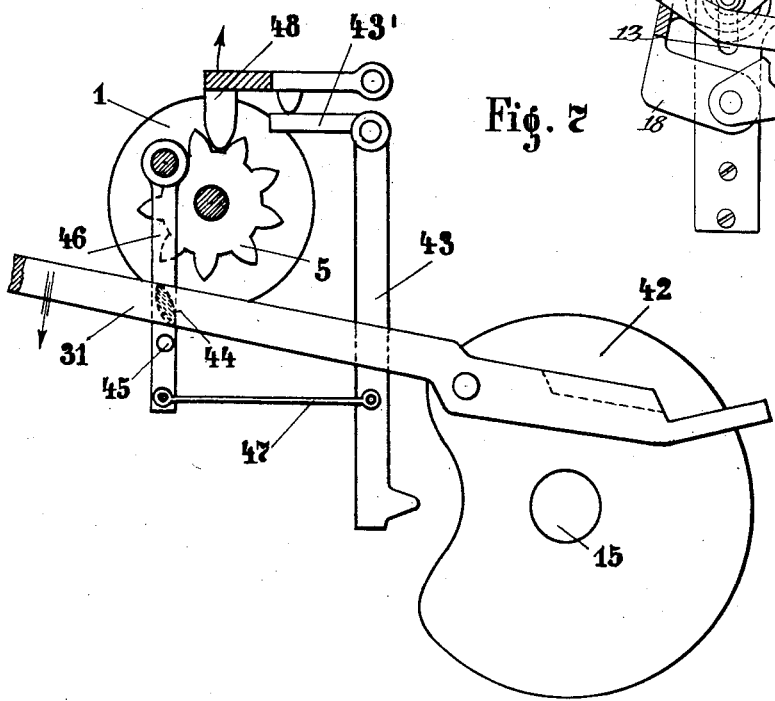
Witnesses:
M. E. McAdu.
C. D. Kesler
Inventor
Carl Schaller
by
James L. Norris,
Attorney

C. SCHALLER.
CALCULATING MACHINE.
APPLICATION FILED JULY 10, 1916.

1,400,004.

Patented Dec. 13, 1921.
6 SHEETS—SHEET 6.

Witnesses:
M. E. McDade
C. D. Kesler

Inventor
Carl Schaller
by
Chas. L. Norris
Attorney

UNITED STATES PATENT OFFICE.

CARL SCHALLER, OF BRUNSWICK, GERMANY, ASSIGNOR TO GRIMME, NATALIS & CO., COMMANDITGESELLSCHAFT AUF ACTIEN, OF BRUNSWICK, GERMANY, A CORPORATION OF GERMANY.

CALCULATING-MACHINE.

1,400,004.  Specification of Letters Patent.  Patented Dec. 13, 1921.

Application filed July 10, 1916. Serial No. 108,446.

(GRANTED UNDER THE PROVISIONS OF THE ACT OF MARCH 3, 1921, 41 STAT. L., 1313.)

*To all whom it may concern:*

Be it known that I, CARL SCHALLER, a citizen of the Duchy of Brunswick, Empire of Germany, residing at Brunswick, Germany, have invented certain new and useful improvements in Calculating-Machines, (for which I have filed an application in Germany, July 7, 1915,) of which the following is a specification.

My present invention relates to calculating machines, and in particular to calculating machines having a revolution counter operatively connected to the main operating member of the machine, which counter is turned one step at each revolution of the said main operating member.

It is a main object of my present invention to provide an improved construction for turning the revolution counter one step at each revolution of the main operating member of the machine. Another object of my invention is to provide an improved locking device for the driving or counter-turning member proper. Another object of my invention is to insert between the main actuating member and the driving member a motion reversing device. Still another object of my invention is to provide means by which the said motion reversing device is rendered automatically controllable from the main operating member of the machine and more specifically in accordance with the direction of rotation of said main operating member. Still another object of my invention is to provide improvements in connection with the zero restoring means. A further object of my invention is the provision of locking means for the revolution counting wheels, and further to render the said locking means controllable from the main operating member as well as from the zero restoring mechanism. Further objects of my invention will appear in the description hereinafter and will be set forth in the claims appended.

With these and other objects in view my invention consists in novel and improved mechanism which I will now describe more specifically.

In the accompanying drawings, which form a part of the specification I have shown an embodiment of my invention by way of example. Figure 1 of said drawings represents a side view of such parts of a calculating machine as are necessary for the proper understanding of my present invention; some of the parts being shown in section.

Fig. 1ª is a rear view of the parts shown in Fig. 1, while

Fig. 2 is a side view similar to Fig. 1, but with the parts in another relative position.

Fig. 5 is a side view similar to Fig. 3, but with some parts added thereto.

Figs. 5ª and 5ᵇ are fragmentary rear views of Fig. 5 with some of the parts in different relative positions, while Fig. 5ᶜ shows the relative position of some parts, shown in Fig. 5ᵇ, in a fragmentary side view.

Fig. 6 is a detail view of a locking pin employed in the construction shown in Figs. 5ª and 5ᵇ.

Fig. 7 is a side view of a cam and lever actuated mechanism for automatically rendering inoperative a locking device provided in connection with the revolution counter.

Figure 8:
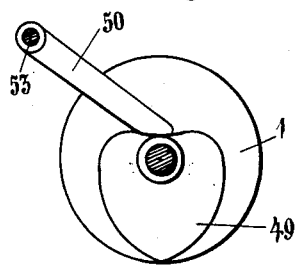
Figure 9:
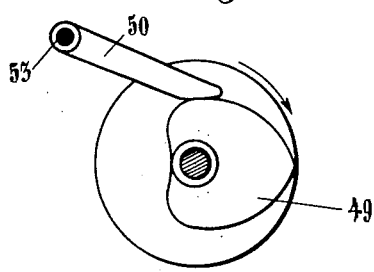
Figure 10:
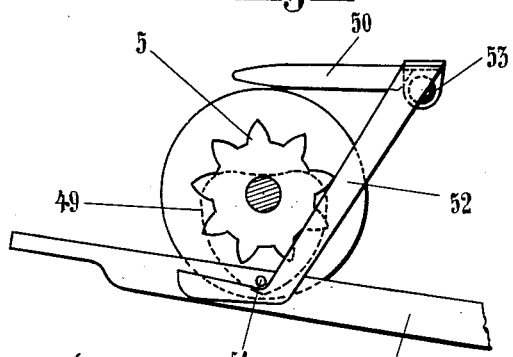

Figs. 8, 9, and 10 are in side views of a restoring device employed in conjunction with the revolution counter.

Fig. 11 is an enlarged detail view showing the manner in which the locking lever is released.

Referring to the drawings, 4 designates a driving lever which is pivotally mounted on a shaft 3 and is adapted to be oscillated from the main operating handle 2 in a manner, and by means, to be described hereinafter. The lever 4 is provided with an indentation formed by two spaced projections located at its upper end. Above the lever 4 is disposed the revolution counter 1 having a toothed wheel 5 which will be engaged by said indentation when the lever 4 with its supporting shaft 3, is bodily raised. When the lever 4 has imparted to it a swinging movement to the left, or the right, the counter 1 will be turned one step in a corresponding direction.

Figure 1:
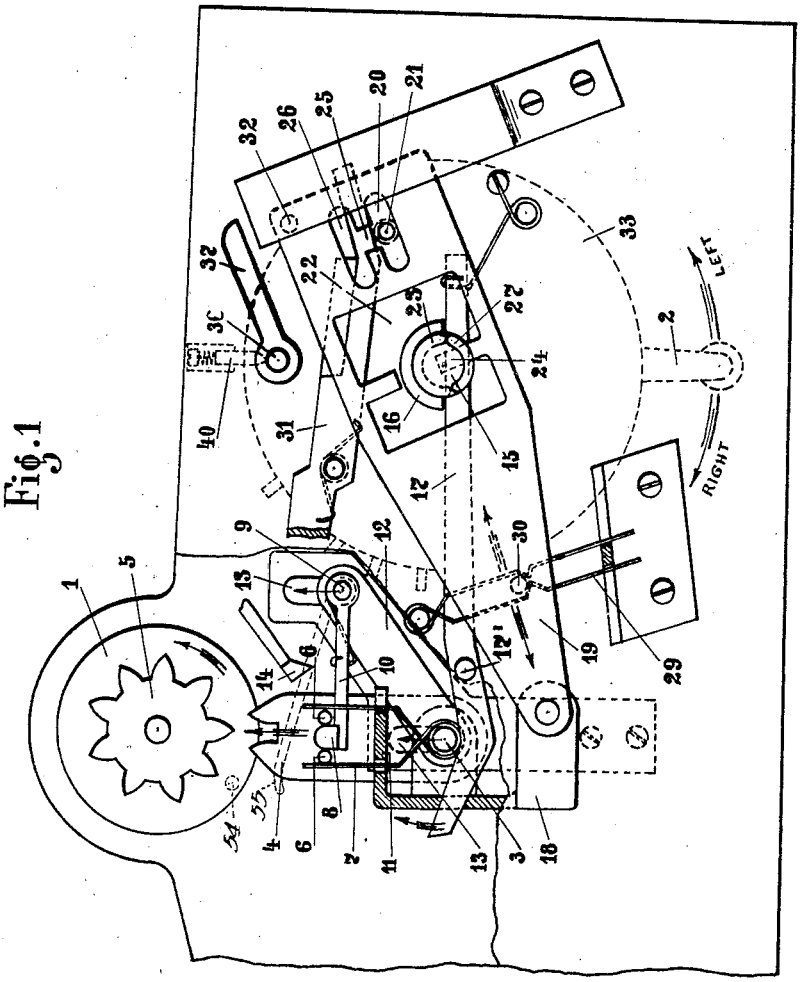

The driving lever 4 is provided with two laterally projecting pins 6, against each of which bears a leg of a two legged spring 7, the said resilient legs being disposed to act from opposite directions and tending to hold the lever 4 in the median position shown in Fig. 1. As shown in the illustrative example, the spring 7 is supported on the shaft 3 which passes through the eye of the spring 7. There is also provided an additional means for retaining the driving lever 4 in the median position, such means consisting of a spring controlled locking lever 10 having a projection or head 8 which enters between the pins 6. The locking lever 10 is pivotally mounted on a shaft 9. Between the legs of the spring 7 is provided a bridge piece 11 which is mounted to rock the shaft 3. The two shafts 3 and 9 are mounted in a common frame 12 which is capable of a reciprocatory vertical movement within the limits of the parallel vertical guide slots 13, 13, through which the shaft ends project. If the frame 12 with the shafts 3 and 9 is being raised by means to be described hereinafter, the driving lever 4 enters into engagement with the pinion 5 while the locking lever 10 contacts with a stationary check 14 and is depressed thereby so as to disengage its head 8 from the pins 6, 6; thus permitting the lever 4 to swing in either direction under pressure of its spring 7 (see Fig. 2).

The swinging movement of the driving lever 4 is brought about through the agency of the bridge piece 11 which is operatively connected with the main actuating handle of the machine. As is well known in machines of this character, the main operating handle is to be turned in one direction for the purpose of causing an adding and multiplying operation, and in the opposite direction for the purpose of causing an operation of subtraction and division. In accordance with the direction in which the said handle is being actuated, the bridge will be caused to swing to the left or to the right thereby restraining the left or right hand leg of the spring 7 from acting upon the corresponding pin 6 of the lever 4 which will then follow the action of the opposite spring leg and swing simultaneously with the bridge 11 and in the same direction, as will be readily understood by reference to Fig. 2.

The displacement of the frame 12 with the shafts moving in parallel paths, is effected at each revolution of the main operating handle by means which will now be described. On the shaft 15 which carries the main operating handle 2 is provided a cam 16 of a semi-cylindrical form and disposed to co-act with a spring controlled lifting lever 17, the latter being fulcrumed at 17' and engaging the frame 12 from below in any suitable manner, as for instance, by loosely bearing against the shaft 3. Whether the shaft 15 be rotated to the right or to the left, the cam 16 will swing the lever 17 in either case and thereby raise the frame 12 with the shaft 3.

The swinging movement of the controlling bridge 11 is effected through the agency of the following mechanism operatively connecting the controlling bridge to the main operating handle of the machine.

The bridge 11 is provided at one end with an extension 18 to which is pivotally connected a controlling frame 19. The frame 19 has a guide slot 20 engaging a stationary pin 21 and is capable of a longitudinal sliding movement upon the pin 21 and in either direction from the median position shown in Fig. 1. This sliding movement is produced by means of the semi-cylindrical cam portion 23 of the shaft 15 projecting through the opening 22 of the frame 19. Within the opening is disposed a check 24 that is preferably integral with the frame and projects into the path of the cam portion 23. When the shaft is being turned to the right or to the left, the cam 23 will then engage the check 24 and thereby cause the frame 19 to move in a corresponding direction. Since the frame 19 is pivotally connected to the bridge piece 11, any longitudinal movement of the former will cause the latter to swing in an opposite direction. As I have described hereinbefore, any swinging movement of the controlling bridge 11 is accompanied by a corresponding movement of the driving lever 4. In Fig. 2 the described machine parts are shown in the relative positions following an actuation of the main operating handle in clockwise direction.

It follows that on actuation of the handle 2 in clockwise direction (as required for a multiplying operation), the revolution counter 1 will be turned in counter-clockwise direction, viz., in the direction indicated by the arrow in Fig. 1. However, if the main operating member 2 is turned to the left, as would be required for the purpose of subtracting a number from a product previously obtained by a multiplying operation, or for the purpose of restoring a multiplication turn erroneously carried out to an extent in excess of the requirement, the carrying movement of the revolution counter would then be directed opposite to the direction of the arrow.

If a division is to be performed in the machine, the left-hand rotation of the main operating handle is then to be recorded in the direction in which the registering digits increase, viz. running from 0 to 9. The transmission of the motion of the main operating handle to the counting mechanism is then required to be reversed. For obtaining this effect the following mechanism is employed.

Figure 3:
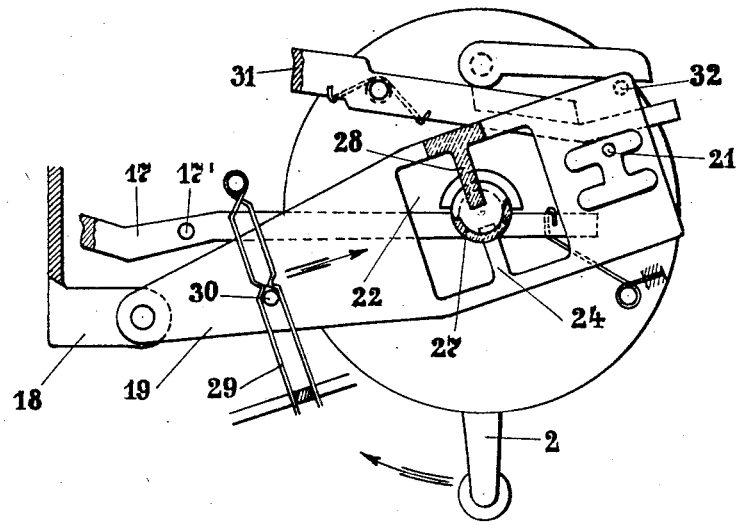
Figs. 3 and 4 are side views similar to Figs. 1 and 2, but with the parts shown in different relative positions in each instance; while Fig. 3ª is a rear view, partly in section, of the parts shown in Fig. 3.

The frame 19 is adapted to be moved into a second operative position. For that purpose, there is provided a slot 26 which is disposed in parallel relation to the slot 20 and communicates therewith by means of a vertical passage 25. When the frame 19 is lowered in such a manner that the stationary pin 21 passes through the passage 25 into the slot 26, the frame 19 can then perform a similar longitudinal movement as described above with respect to the office of the slot 20. In the second operative position of the frame 19 the latter is actuated by a second semi-cylindrical cam 27 which is indicated in section in Figs. 3 and 4 and is disposed at the end of the shaft 15 and opposite to the cam 23, it being understood that these two cams operate in different vertical planes. The cam 27 co-acts with a second check 28 similar to and disposed opposite the check 24, though in a different working plane, as is clearly shown in the rear views in Figs. 1ª and 3ª. With the frame 19 in its second or lower operative position a clockwise rotation of the main operating handle (see the arrow in Fig. 3) will produce a shifting movement of the frame 19 to the right and in consequence a rotary movement of the revolution counter to the right, that is, opposite to the direction resulting from the same movement of the main operating member with the frame 19 in its first, or raised, operative position. By means of a spring 29 having doubled legs adapted to engage with a laterally projecting pin 30 on the frame 19, the latter is always restored to its median position, shown in Figs. 1 and 3. The spring 29 is preferably constructed to operate in both positions of the frame 19 and simultaneously tends to yieldingly retain the latter in either of these positions. For that purpose, the legs of the spring 29 are provided with angular bends forming a restricted passage for the pin 30 which requires the application of a slight pressure in order for the pin to pass with the frame 19 from one operative position to the other. Once the pin 30 has been forced past the restricted portion, the latter offers sufficient resistance to prevent an accidental return of the frame.

The displacement of the frame 19 into either working position, for multiplication or division respectively, may be performed manually, by pressing down, or raising, the frame by hand. It is one of the objects of my present invention to provide a mechanism therefore, the construction and function of which is based on the following consideration.

Before the commencement of each fresh computative operation of the machine, the result of the prior computation must be removed, that is to say, the revolution counter 1 must be restored to zero. If the mechanism for thus restoring the zero position of the counter is combined with a device for automatically shifting the frame 19 into the proper position for multiplication, unless the same occupies this position already, then, a multiplying operation may be started at any time without any adjustment whatever. If division is to be performed, the first turn of the main operating member will have to be directed to the left. Provision may be readily made for shifting the frame 19 into the other working position at each left-hand turn of the main operating handle.

However, to prevent such a shifting of the frame into the other working position, and the consequent reversal of the direction of rotation of the revolution counter, when the main operating member is turned to the left in the course of an adding or multiplying operation, the mechanism may be constructed that the first turn to the right of the main operating member shall render inoperative the device for shifting the frame 19 into the second working position, whereby it is insured that the latter shift will take place only when the first turn of the main operating member is a left-hand turn, whereas when the first turn is toward the right such shift is precluded.

This further object of my present invention is attained by means which I will now proceed to describe.

For restoring the revolution counter consisting of a series of juxtaposed counting wheels 1, to zero, a device may be employed which is illustrated in the Figs. 8 and 9. Each counting wheel 1 is provided, at the side away from the pinion 5, with a heart cam 49 which changes its position when the associated counting wheel is turned; Fig. 9. For each counting wheel 1 is also provided a feeler 50 contacting with the associated heart cam 49 and being journaled on a common shaft 53. The series of juxtaposed feelers 50 required for a complete counter, forms a rake, the component teeth or feelers of which are adapted to be moved simultaneously. When any of these feelers exerts a pressure upon the attached heart cam which may for instance occupy the position indicated in Fig. 9, the cam will then be caused to move into the position shown in Fig. 8 and corresponding to the zero position of the associated counting wheel 1, owing to the pressure imposed by the feeler sliding along the curved edge face of the heart cam. In this manner, the counting wheels are restored to their initial or zero position. The necessary pressure is transmitted to the feelers 50 through the lever 31 operatively connected to the feeler rake by means of an angle piece 52 and the pin 51 co-acting therewith; Fig. 10.

Figure 4:
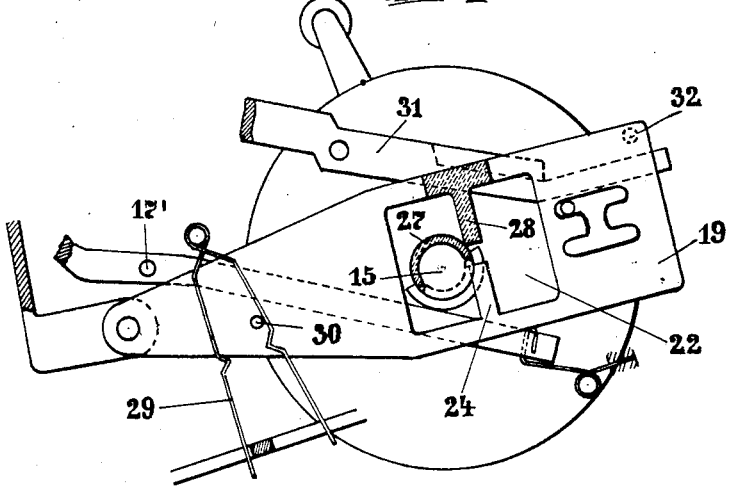

In Figs. 4 and 5 only the actuating or pressure lever 31 by means of which the zero position of the counter wheels is restored, is indicated. For the purpose of the present invention, the zero restoring lever 31 is provided with an extension which engages a laterally projecting pin 32 on the frame 19, raising the latter into its upper operative position, unless the frame occupies the upper position already. As has been set forth hereinbefore, the upper position of the frame 19 is the proper working position for multiplication. If at the commencement of a computation the main operating member is turned to the left instead of to the right, an arm 35 extending from a short shaft 36 is turned by a pin 34 secured upon a disk 33 which is mounted upon and revolves with the main shaft 15; see Figs. 5$^a$, 5$^b$, and 5$^c$. The short shaft 36 is provided with a second arm 37 at the opposite end, which second arm 37 is disposed to act upon the pin 32 from above when the shaft 36 is being rotated, thereby pressing the frame 19 downward into the proper working position for division.

However, if at the first instance the main operating member is moved to the right, then, an oblique cam face 38 provided at and preferably within the side face of the disk 33 comes into action to engage the end face of the shaft 36, thereby displacing the latter longitudinally into the position shown in Fig. 5$^b$ in which the arm 35 is withdrawn from the path of action of the pin 34. In consequence, the frame remains in its raised position, viz. the proper working position for multiplication, even when after one or a succession of revolutions to the right a left-hand turn occurs. On restoring the counting mechanism to zero through the agency of the lever 31, an oblique operating face 39 provided at the extension of the lever 31, engages the outer end face of the short shaft 36 and returns the same into the path of action of the pin 34.

To secure the short shaft 36 in its two extreme positions in longitudinal direction, a spring actuated locking pin 40 is provided within a suitable part of the machine frame so as to engage into properly disposed notches 41 having wedge-like walls, the beveled terminal of the locking pin 40 permitting the return of the shaft into its inoperative position after the latter has been rocked.

It is a requisite to normally lock the counting wheels 1 in their position and release the same only for the interval during which they are to be turned by the main operating member or through the agency of the zero restoring lever 31. The locking means provided for this purpose comprise a series of locking levers 48 (Fig. 7) forming a rake that extends parallel to the axis of the counting pinions 5. The said rake is oscillatingly supported and contacts with the arm 43' of a bell-crank lever 43, 43', which may be caused to rock by the cam 42 fixedly mounted on the main crank shaft 15, thereby raising the rake. The bell-crank lever 43, 43', is also connected to be operated by the restoring lever 31 by means of a pendant 46 disposed parallel with the lever arm 43 and a connecting rod 47. The pendant 46 is provided with a stop 45 adapted to co-act with an oblique displacing member 44. On depression of the zero restoring lever 31, the displacing member meets the stop 45 and causes the pendant to swing. The bell-crank lever 43, 43' is likewise caused to swing and thereby unlocks the counting pinions 5.

The check 14, Figs. 1, and 1$^a$, on which depends the release of the lock 10 and, hence, the actual performance of the counting operation, is provided at the first instance for the units only. Since in calculating machines of the character under consideration, as is well known, the revolution counting mechanism is mounted in a carriage adapted to be advanced from one denominational position to the next, the counting mechanism is likewise required to be actuated in positions corresponding to tens, hundreds, and so on, after the carriage has been moved into the respective position. In machines of this character, in which the revolution counting mechanism is not adapted to travel with the carriage, but remains stationary, it is the actuating member which is rendered capable of traveling with the carriage. Exactly such a device may be adopted with regard to the check 14, viz., to enable the check to travel in conjunction with the driving member; thereby simplifying the machine since in this case the member that causes the actuation is not revoluble but is relatively stationary.

The novel disposition according to my invention inherently contains a simple solution of the problem of the carrying of the tens. When the driving levers 4 are moved into engagement with the pinions 5 and the corresponding number of bridges 11 are swung in the required direction as will be the case at each revolution of the main operating member, all that is required to cause the associated counting wheels to move one step is to depress the locking lever 10. This depression is effected by means of a pin 54 (Fig. 11) disposed on the counting wheel 1, or pinion 5, of the next lower denominational order, in such a manner as to actuate the lever 10 at the moment the wheel, or pinion, carrying the depressing pin, passes the digit 9. For this purpose the locking lever 10, which is pivoted on shaft 9, is provided with a second lever arm 55 (Figs. 1 and 11), which is positioned on the side of the pinion 5 belonging to the counting wheel of next lower order, so that the pin 54 carried by said pinion, or by the associated counting wheel, as soon as the latter passes beyond "9," will depress the said arm 55, and with it the locking lever 10, thereby releasing the driving lever 4, which, under the tension of its spring 7, swings about its pivot 3 (to the right in Fig. 11) and thus turns the counting wheel one step.

What I claim as my invention and desire to secure by Letters Patent of the United States, is:

1. In a machine of the character described, the combination with a revolution counting mechanism comprising a pinion, and a revoluble main actuator, of an oscillatory driving member adapted to engage and advance said counting pinion one step in either direction, resilient means adapted to act upon both sides of said driving member simultaneously, so as to retain said carrying member in its median or ineffective position, a sliding support for said driving member adapted to move the same into and out of engagement with said counting pinion, operative connections between said sliding support and said revoluble main actuator, whereby said sliding support is moved toward and away from said counting pinion at each revolution of said main actuator for the purpose of causing said driving member to engage and disengage said pinion, and means in operative connection with said revoluble main actuator and said resilient means, for removing the pressure exerted by said resilient means upon one side of said driving member at each revolution of said main actuator in order to cause said driving member to swing toward that side and to turn said counting pinion one step in the corresponding direction.

2. In a machine of the character described, the combination with a revolution counting mechanism, comprising a pinion, and a revoluble main actuator, of an oscillatory driving member adapted to engage and advance said counting pinion one step in either direction, resilient means adapted to act upon both sides of said driving member simultaneously, so as to retain said carrying member in its median or ineffective position, a sliding support for said carrying member and adapted to move said driving member into and out of engagement with the same counting pinion, an oscillatory locking member adapted to secure said driving member in its ineffective position, said oscillatory locking member being mounted on said sliding support so as to move therewith, a relatively stationary check in the path of movement of said oscillatory locking member adapted to cause the same to release the said driving member when the latter is moved into engagement with said pinion, operative connections between said sliding support and said revoluble main actuator, whereby said sliding support is moved toward and away from said counting pinion at each revolution of said main actuator for the purpose of causing said driving member to engage and disengage said pinion, and means in operative connection with said revoluble main actuator and said resilient means, whereby said main actuator is enabled to remove the pressure exerted by said resilient means upon one side of said driving member on being revolved in one direction and to remove the pressure exerted upon the opposite side thereof on being revolved in the opposite direction so that at each revolution of said main actuator said driving member is caused to turn said counting pinion one step in a direction depending on the directon of rotation of said actuator.

3. In a machine of the character described, the combination with a revolution counting mechanism comprising a pinion for each denominational order, and a revoluble main actuator, of an oscillatory driving member adapted to engage and advance said counting pinion one step in either direction, resilient means adapted to act upon both sides of said driving member simultaneously, so as to retain said carrying member in its median or ineffective position, a sliding support for said driving member and adapted to move the same into and out of engagement with said counting pinion, an oscillatory locking member adapted to lock said driving member in its ineffective position, and oscillatory locking member being mounted on said sliding support and adapted to be acted upon by the counting pinion of the next lower denominational order when the said latter pinion passing its 9 position from either direction, a relatively stationary check in the path of said oscillatory locking member and adapted to release the same from said carrying member when the latter is moved into engagement with the associated counting pinion, operative connections between said sliding support and said revoluble main actuator, whereby said sliding support is reciprocated at each revolution of said main actuator for the purpose of causing said driving member to engage and disengage said pinion, and means in operative connection with said revoluble main actuator and said resilient means, whereby said main actuator is enabled to remove the pressure exerted by said resilient means upon one side of said driving member on being revolved in one direction and to remove the pressure exerted upon the opposite side thereof on being revolved in the opposite direction so that at each revolution of said main actuator said driving member is caused to turn said counting pinion one step in a direction depending on the direction of rotation of said actuator.

4. In a machine of the character described, the combination with a revolution counting mechanism comprising a pinion, and a revoluble main actuator, of an oscillatory driving member adapted to engage and advance said counting pinion for one step in either direction, resilient means adapted to act upon both sides of said driving member simultaneously, a sliding support for said driving member adapted to move the same into and out of engagement with said counting pinion, operative connections between said support and said revoluble main actuator, whereby said sliding support is reciprocated at each revolution of said main actuator for the purpose of causing said driving member to engage and disengage said pinion, means in operative connection with said revoluble main actuator and said resilient means, whereby said main actuator is enabled to remove the pressure exerted by said resilient means upon one side of said driving member, on being revolved in one direction and to remove the pressure exerted upon the opposite side thereof on being revolved in the opposite direction so that at each revolution of said main actuator said driving member is caused to turn said counting pinion one step in a direction depending on the direction of rotation of said actuator, and a motion reversing device in operative connection with said last named means, whereby the normal direction of motion transmission from said revoluble main actuator to said driving member can be reversed.

5. In a machine of the character described, the combination with a revolution counting mechanism comprising a pinion for each denominational order, and a revoluble main actuator, of an oscillatory driving member adapted to engage and advance said counting pinion one step in either direction, resilient means adapted to act upon both sides of said driving member simultaneously, a sliding support for said driving member adapted to move the same into and out of engagement with said counting pinion, a locking member mounted on said sliding support and adapted to lock said driving member in its neutral or ineffective position, a relatively stationary stop adapted to render said locking member inoperative when said carrying member is caused to engage with its associated pinion, operative connections between said support and said revoluble main actuator, whereby said sliding support is reciprocated at each revolution of said main actuator for the purpose of causing said driving member to engage and disengage said pinion, means in operative connection with said revoluble main actuator and said resilient means, whereby said main actuator is enabled to remove the pressure exerted by said resilient means on one side on being revolved in one direction and to remove the pressure exerted on the opposite side on being revolved in the opposite direction so that at each revolution of said main actuator said driving member is caused to turn said counting pinion one step in a direction depending on the direction of rotation of said actuator, and a motion reversing device in operative connection with said last named means, whereby the normal direction of motion transmission from said revoluble main actuator to said driving member can be reversed.

6. In a machine of the character described, the combination with a revolution counting mechanism comprising a pinion, and a revoluble main actuator, of an oscillatory driving member adapted to engage and advance said counting pinion one step in either direction, resilient means adapted to act upon both sides of said driving member simultaneously, a sliding support for said driving member adapted to move the same into and out of engagement with said counting pinion, operative connections between said support and said revoluble main actuator, whereby said sliding support is reciprocated at each revolution of said main actuator for the purpose of causing said driving member to engage and disengage said pinion, a motion transmitting device in operative connection with said revoluble main actuator and said resilient means for removing the pressure exerted by said resilient means on either side of said driving member at each revolution of said main actuator in order to cause said driving member to swing toward the side determined by the direction of motion of the main actuator and to turn said counting pinion one step in a corresponding direction, oppositely disposed actuating connections between said motion transmitting device and said main actuator, and a shiftable mount for said motion transmitting device to enable the latter device to be brought into engagement alternately with either of said oppositely disposed actuating connections, whereby the normal direction of motion transmission from said main actuator to said driving member can be reversed.

7. In a machine of the character described, the combination with a revolution counting mechanism comprising a pinion for each denominational order, and a revoluble main actuator, of an oscillatory driving member adapted to engage and advance said counting pinion one step in either direction, resilient means adapted to act upon both sides of said driving member simultaneously, a sliding support for said driving member adapted to move the same into and out of engagement with said counting pinion, a locking member mounted on said sliding support and adapted to lock said driving member in its ineffective position, a second member adapted to render said locking member ineffective when said driving member is in engagement with its associated pinion, operative connections between said support and said revoluble main actuator, whereby said sliding support is reciprocated at each revolution of said main actuator for the purpose of causing said driving member to engage and disengage said pinion, a motion transmitting device in operative connection with said revoluble main actuator and said resilient means for removing the pressure exerted by said resilient means on either side of said driving member at each revolution of said main actuator in order to cause said carrying member to swing toward the side determined by the direction of motion of the main actuator and to turn said counting pinion one step in a corresponding direction, oppositely disposed actuating connections between said motion transmitting device and said main actuator, and a shiftable mount for said motion transmitting device to enable the latter device to be brought into engagement alternately with either of said oppositely disposed actuating connections, whereby the normal direction of motion transmission from said main actuator to said driving member can be reversed.

8. In a machine of the character described, the combination with a revolution counting mechanism comprising a pinion for each denominational order, a zero restoring device in conjunction with the revolution counting mechanism, and a revoluble main actuator, of an oscillatory driving member adapted to engage and advance said counting pinion one step in either direction, resilient means adapted to act upon both sides of said driving member simultaneously, a sliding support member adapted to move the same into and out of engagement with said counting pinion, operative connections between said support and said revoluble main actuator, whereby said sliding support is reciprocated at each revolution of said main actuator for the purpose of causing said driving member to engage and disengage said pinion, means in operative connection with said revoluble main actuator and said resilient means, whereby said main actuator is enabled to remove the pressure exerted by said resilient means on one side of said driving member on being revolved in one direction and to remove the pressure exerted on the opposite side thereof on being revolved in the opposite direction so that at each revolution of said main actuator said driving member is caused to turn said counting pinion one step in a direction depending on the direction of rotation of said actuator, a motion reversing device in operative connection with said last named means, whereby the normal direction of motion transmission from said revoluble main actuator to said driving member can be reversed, and an operative connection between the zero restoring device and said motion reversing device for setting said last named device into a predetermined initial position through operation of said zero restoring device.

9. In a machine of the character described, the combination with a revolution counting mechanism comprising a pinion for each denominational order, a zero restoring device in conjunction with the revolution counting mechanism, and a revoluble main actuator, of an oscillatory driving member adapted to engage and advance said counting pinion one step in either direction, resilient means adapted to act upon both sides of said driving member simultaneously, a sliding support for said driving member adapted to move the same into and out of engagement with said counting pinion, operative connections between said support and said revoluble main actuator, whereby said sliding support is reciprocated at each revolution of said main actuator for the purpose of causing said driving member to engage and disengage said pinion, a motion transmitting device in operative connection with said revoluble main actuator and said resilient means to remove the pressure exerted by said resilient means on either side of said driving member at each revolution of said main actuator in order to cause said driving member to swing toward the side determined by the direction of rotation of the main actuator and to turn said counting pinion one step in a corresponding direction, oppositely disposed actuating connections between said motion transmitting device and said main actuator, a shiftable mount for said motion transmitting device to enable the latter device to be alternately shifted into engagement with either of said oppositely disposed actuating connections, whereby the normal direction of motion transmission from said main actuator to said driving member can be reversed, an operative connection between the zero restoring device and said shiftable motion transmitter for automatically shifting said transmitter into working position for multiplication at each actuation of said zero restoring device, and means in operative connection with said main actuator for automatically shifting the said transmitter into a position opposite to the last named working position on actuation of said main actuator in the direction for division.

10. In a machine of the character described, the combination with a revolution counting mechanism comprising a pinion for each denominational order, a zero restoring device in conjunction with the revolution counting mechanism, and a revoluble main actuator, of an oscillatory driving member adapted to engage and advance said counting pinion one step in either direction, resilient means adapted to act upon both sides of said driving member simultaneously, a sliding support for said driving member adapted to move the same into and out of engagement with said counting pinion, operative connections between said support and said revoluble main actuator, whereby said sliding support is reciprocated at each revolution of said main actuator for the purpose of causing said driving member to engage and disengage said pinion, a motion transmitting device in operative connection with said revoluble main actuator and said resilent means for removing the pressure exerted by said resilient means on either side of said driving member at each revolution of said main actuator in order to cause said driving member to swing toward the side determined by the direction of rotation of the main actuator and to turn said counting pinion one step in a corresponding direction, oppositely disposed actuating connections between said motion transmitting device and said main actuator, a shiftable mount for said motion transmitting device to enable the latter device to be alternately shifted into engagement with either of said oppositely disposed actuating connections, whereby the normal direction of motion transmission from said main actuator to said driving member can be reversed, an operative connection between the zero restoring device and said shiftable motion transmitter for automatically shifting said transmitter into working position for multiplication at each actuation of said zero restoring device, means in operative connection with said main actuator for automatically shifting the said transmitter into a position opposite to the last named working position on actuation of said main actuator in the direction for division, and means for rendering said last named means inoperative through an initial actuation of the main actuator in the direction for multiplication so that no shifting of the said transmitter occurs when during a multiplying operation the main actuator is turned in the opposite direction.

11. In a machine of the character described, the combination with a revolution counting mechanism comprising a pinion for each denominational order, and a revoluble main actuator, of an oscillatory driving member adapted to engage and advance said counting pinion for one step in either direction, resilient means adapted to act upon both sides of said driving member simultaneously, a sliding support for said member adapted to move the same into and out of engagement with said counting pinion, operative connections between said support and said revoluble main actuator, whereby said sliding support is reciprocated at each revolution of said main actuator for the purpose of causing said driving member to engage and disengage said pinion, a motion transmitting device in operative connection with said revoluble main actuator and said resilient means for removing the pressure exerted by said resilient means on either side of said driving member at each revolution of said main actuator in order to cause said driving member to swing toward the side determined by the direction of rotation of the main actuator and to turn said counting pinion one step in a corresponding direction, oppositely disposed actuating connections between said motion transmitting device and said main actuator, a shiftable mount for said motion transmitting device to enable the latter device to be alternately shifted into engagment with either of said oppositely disposed actuating connections, whereby the normal direction of motion transmission from said main actuator to said carrying member can be reversed, and a longitudinally slidable and oscillatory member in operative connection with said main actuator and adapted to contact with and shift said motion transmitting device on said main actuator being initially revolved in a predetermined direction while said member is longitudinally displaced and thereby rendered ineffective by said main actuator when the latter is being initially revolved in a direction opposite to said predetermined direction.

12. In a machine of the character described, the combination with a revolution counting mechanism comprising a plurality of counting pinions one for each denominational order, a zero restoring device in conjunction with the revolution counting mechanism, and a revoluble main actuator, of an oscillatory driving member for each counting pinion adapted to engage and advance the associated pinion one step in either direction, resilient means adapted to act upon both sides of said driving member simultaneously, a sliding support for said driving member adapted to move the same into and out of engagement with the said counting pinion, operative connections between said support and said revoluble main actuator, whereby said sliding support is reciprocated at each revolution of said main actuator for the purpose of causing said driving member to engage and disengage said pinion, and means in operative connection with said revoluble main actuator and said resilient means for removing the pressure exerted by said resilient means on either side of said driving member at each revolution of said main actuator in order to cause said driving member to swing toward that side and to turn said counting pinion one step in a corresponding direction, a plurality of locking members one for each of said counting pinions and normally engaging the same, a common mount for said locking members, and operative connections between said common mount, said zero restoring device, and said main actuator, whereby said locking members are rendered ineffective on actuation of said zero restoring device and of said main actuator.

13. In a calculating machine, the combination of a revoluble main actuator; a revolution-counting mechanism comprising a plurality of counting pinions, one for each denominational order; a zero-setting device in conjunction with said revolution-counting mechanism; a plurality of locking members, one for each counting pinion and normally engaged therewith; a releasing member common to all of said locking members; a cam arranged to directly operate said releasing member when said main actuator is operated; and means connected to said cam for operating said releasing member when said zero-setting device is operated.

14. In a calculating machine, the combination of a revoluble main actuator, a revolution-counting mechanism comprising a plurality of counting pinions, one for each denominational order; a zero-setting device in conjunction with said revolution-counting mechanism; a plurality of locking members, one for each counting pinion and normally engaged therewith; a cam arranged to directly operate said releasing member when said actuator is operated; and a lever for operating said releasing member when said zero-setting device is operated, said lever being pivoted on said cam for movement relatively to the same.

15. In a calculating machine, the combination of a revoluble main actuator; a revolution-counting mechanism comprising a plurality of counting pinions, one for each denominational order; a zero-setting device in conjunction with said revolution-counting mechanism; a plurality of locking members one for each counting pinion and normally engaged therewith; a bell crank lever common to all of said locking members to release the same; a cam arranged to directly engage and actuate said bell crank lever when said main actuator is operated; and a member carried by said cam and connected to operate said bell crank lever when said zero-setting device is operated.

16. In a calculating machine, the combination of a plurality of counting pinions; an oscillating driving member individual to each pinion and adapted to engage and rotate the same in either direction; means for normally holding said driving members in ineffective position relative to said pinions; means for moving said driving members toward and into engagement with said pinions; means for normally locking said driving members against oscillation; means for automatically unlocking said driving members during their movement toward said pinions; and spring means associated with said driving members for effecting their pinion-rotating movement and controlling its direction.

17. In a calculating machine, the combination of a plurality of counting pinions; an oscillating driving member individual to each pinion and adapted to engage and rotate the same in either direction; means for normally holding said driving members in ineffective position relative to said pinions; means for moving said driving members toward and into engagement with said pinions; means for normally locking said driving members against oscillation; means for automatically unlocking said driving members during their movement toward said pinions; a two-armed spring acting on opposite sides of each driving member, so as to hold it normally in neutral position; and means associated with each spring for removing the pressure of one arm thereof upon the associated driving member, thereby enabling the latter to be rocked by the other arm of the spring.

18. In a calculating machine, the combination of a plurality of counting pinions; an oscillatory driving member individual to each pinion adapted to engage and rotate the same but normally disengaged therefrom; a locking lever normally engaged with each driving member to hold it against oscillation; means for moving said members into engagement with said pinions; means for automatically disengaging said locking members during such movement; and means for automatically rocking said driving members when so released.

19. In a calculating machine, the combination of a plurality of counting pinions; an oscillatory driving member individual to each pinion adapted to engage and rotate the same but normally disengaged therefrom; a pair of spaced pins provided on each driving member; a locking lever individual to each driving member having a portion engaged between the pair of pins thereon to normally hold the corresponding driving members into engagement with said pinions; means for automatically disengaging said locking levers from said pins during such movement; and means for automatically rocking said driving members when so released.

In testimony whereof I have hereunto set my hand in presence of two subscribing witnesses.

CARL SCHALLER

Witnesses:
 WILHELM LEHRKE,
 EUGENE C. HARTER.